US009422881B2

(12) United States Patent
Maeda et al.

(10) Patent No.: US 9,422,881 B2
(45) Date of Patent: Aug. 23, 2016

(54) VEHICLE CONTROL APPARATUS

(71) Applicant: DENSO CORPORATION, Kariya, Aichi-pref. (JP)

(72) Inventors: Shigeru Maeda, Obu (JP); Tomohisa Ose, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/789,642

(22) Filed: Jul. 1, 2015

(65) Prior Publication Data

US 2016/0017825 A1 Jan. 21, 2016

(30) Foreign Application Priority Data

Jul. 15, 2014 (JP) .................. 2014-145461

(51) Int. Cl.
*B60W 10/02* (2006.01)
*B60W 10/06* (2006.01)
*B60W 10/30* (2006.01)
*F02D 41/02* (2006.01)
*B60W 30/18* (2012.01)
*F02D 29/02* (2006.01)
*F02N 11/08* (2006.01)

(52) U.S. Cl.
CPC ....... *F02D 41/022* (2013.01); *B60W 30/18072* (2013.01); *F02D 29/02* (2013.01); *F02N 11/0833* (2013.01); *F02N 11/084* (2013.01); *F02N 11/0822* (2013.01); *F02N 2200/0801* (2013.01); *F02N 2200/101* (2013.01); *F02N 2200/102* (2013.01)

(58) Field of Classification Search
None
See application file for complete search history.

(56) References Cited

U.S. PATENT DOCUMENTS

| 2013/0116906 A1* | 5/2013 | Christen | B60W 10/02 701/93 |
| 2013/0260960 A1* | 10/2013 | Aoyama | F16H 9/16 477/45 |
| 2013/0311048 A1* | 11/2013 | Ahn | B60W 10/023 701/48 |

FOREIGN PATENT DOCUMENTS

| JP | 2009270598 | 11/2009 |
| JP | 2011219087 | 11/2011 |
| JP | 2013126806 | 6/2013 |

* cited by examiner

*Primary Examiner* — Edwin A Young
(74) *Attorney, Agent, or Firm* — Knobbe, Martens, Olson & Bear, LLP

(57) ABSTRACT

A vehicle control apparatus includes a condition determination section that determines whether or not an execution permission condition to permit coasting of a vehicle is satisfied, a first control section that causes the vehicle to shift to a first inertia running state by stopping the engine and disengaging the clutch device when the execution permission condition is determined to be satisfied, an auxiliary drive request determination section that determines whether or not an auxiliary drive request to drive the auxiliary has occurred, and a second control section that causes the vehicle to shift to a second inertia running state by starting the engine keeping the clutch device disengaged when the auxiliary drive request is determined to have occurred while the vehicle is running in the first inertia running state.

4 Claims, 4 Drawing Sheets

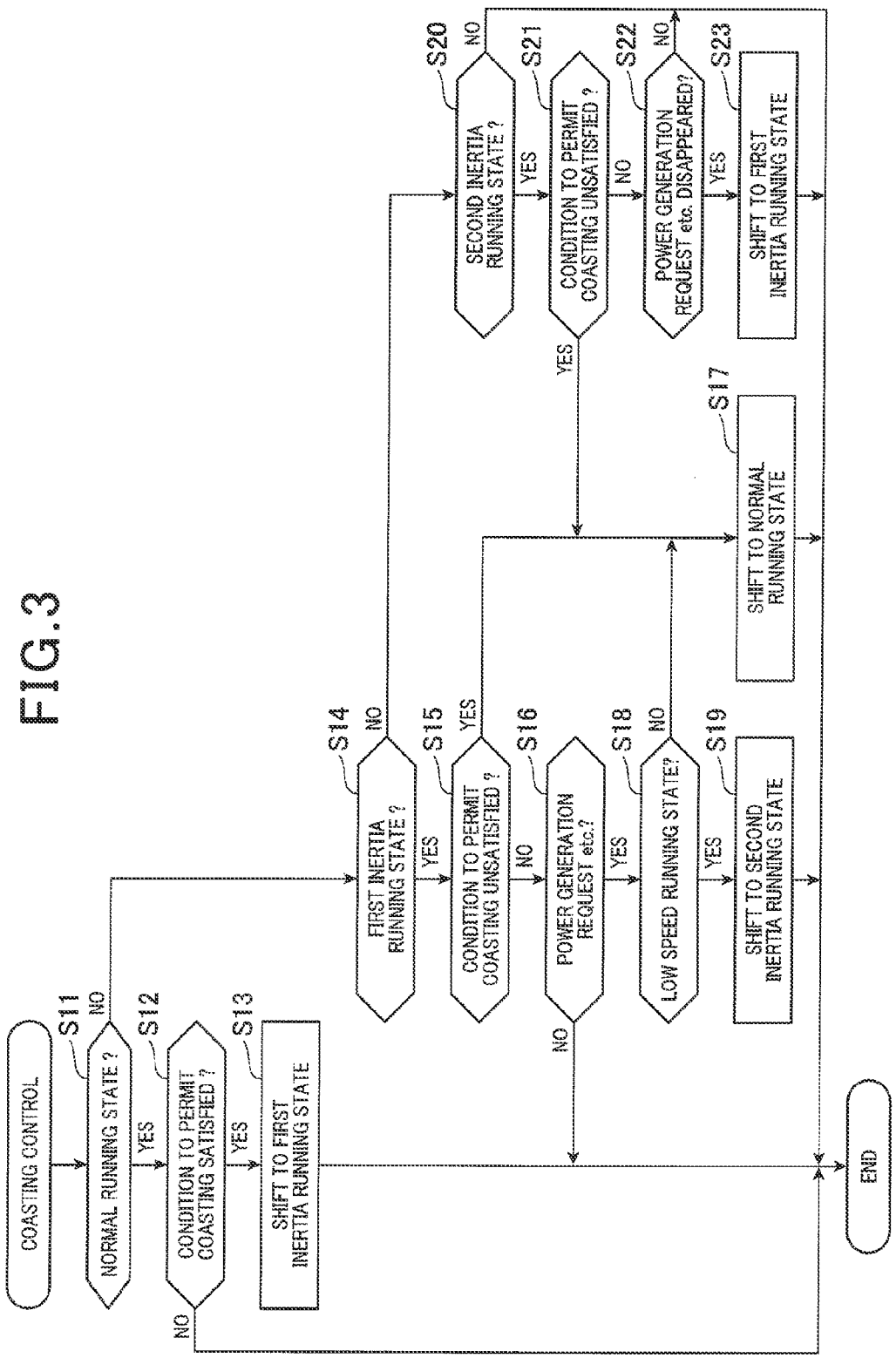

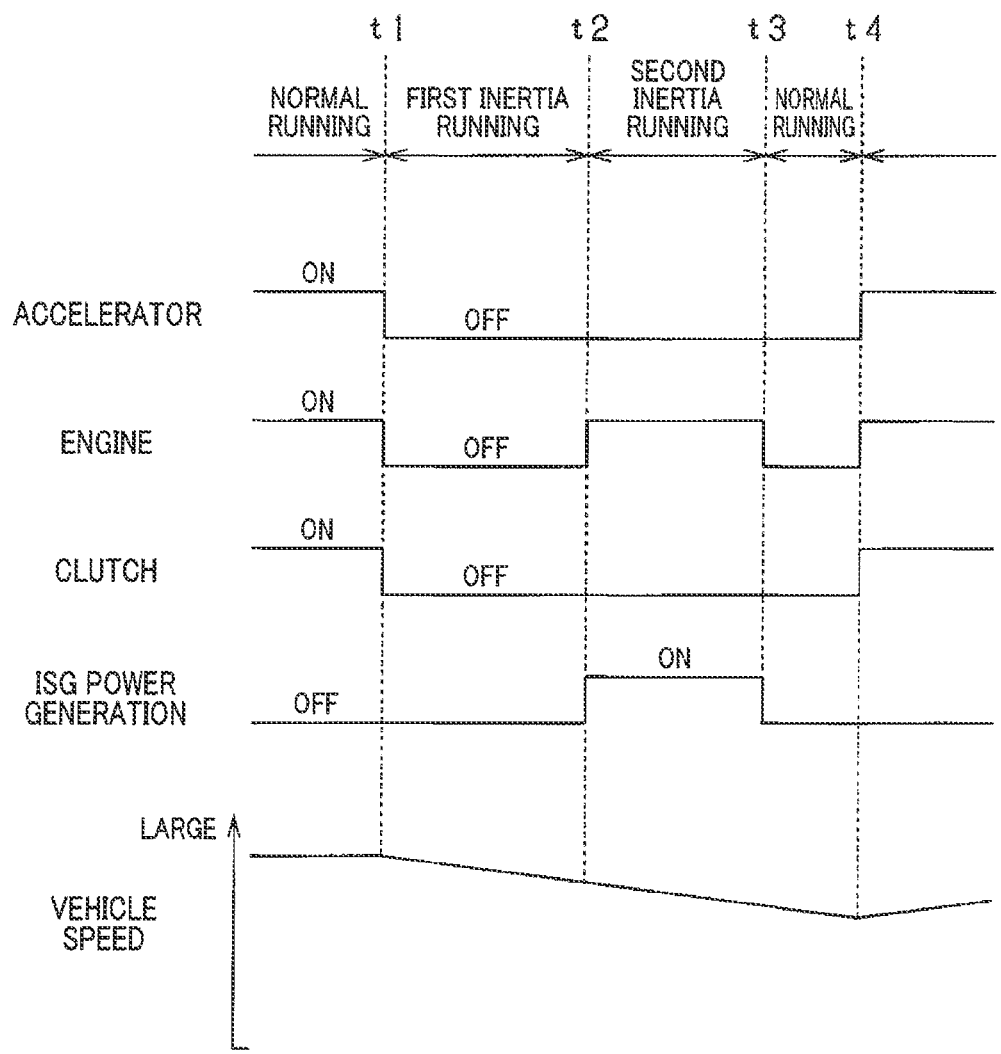

VEHICLE CONTROL APPARATUS

This application claims priority to Japanese Patent Application No. 2014-145461 filed on Jul. 15, 2014, the entire contents of which are hereby incorporated by reference.

BACKGROUND OF THE INVENTION

1. Field of the Invention

The present invention relates to a vehicle control apparatus.

2. Description of Related Art

There is known a technique in which a vehicle is maintained in an inertia running state by disengaging the clutch disposed between the engine and the transmission of the vehicle when the accelerator is off for the purpose of increasing fuel economy and soon. For example, refer to Japanese Patent Application Laid-open No. 2011-219087.

However, the above conventional technique has a problem in that a return from the inertia running state to a normal running state may be made unexpectedly to the vehicle driver. In this case the driver may feel something strange occur, or the effect of increase of fuel economy may not be obtained. For example, since the vehicle may be returned from the inertia running state to the normal running state if a power generation request occurs depending on the remaining capacity of a battery, there is a concern that unexpected vibration may occur due to switching of the clutch from the disengaged state to the engaged state. In addition, since the inertia running state is forcibly ended before the driver presses the accelerator in these case, the effect of increase of fuel economy may become insufficient.

SUMMARY

An exemplary embodiment provides a vehicle control apparatus for a vehicle which includes an engine as a drive power source of the vehicle, an auxiliary driven by the engine, and a clutch device provided in a power transmission route connected to an output shaft of the engine, the vehicle control apparatus including:

a condition determination section that determines whether or not an execution permission condition to permit coasting of the vehicle is satisfied;

a first control section that causes the vehicle to shift to a first inertia running state by stopping the engine and disengaging the clutch device when the execution permission condition is determined to be satisfied;

an auxiliary drive request determination section that determines whether or not an auxiliary drive request to drive the auxiliary has occurred; and a second control section that causes the vehicle to shift to a second inertia running state by starting the engine, keeping the clutch device disengaged when the auxiliary drive request is determined to have occurred while the vehicle is running in the first inertia running state.

According to the exemplary embodiment, there is provided a vehicle control apparatus that can increase fuel economy of a vehicle without causing the vehicle driver to feel that something strange has occurred when the vehicle is coasting.

Other advantages and features of the invention will become apparent from the following description including the drawings and claims.

BRIEF DESCRIPTION OF THE DRAWINGS

In the accompanying drawings:

FIG. 3 is a flowchart showing steps of coasting control performed by the vehicle control apparatus; and FIG. 4 is a time chart for explaining an example of coasting of a vehicle provided with the vehicle control system.

PREFERRED EMBODIMENTS OF THE INVENTION

Figure 1:
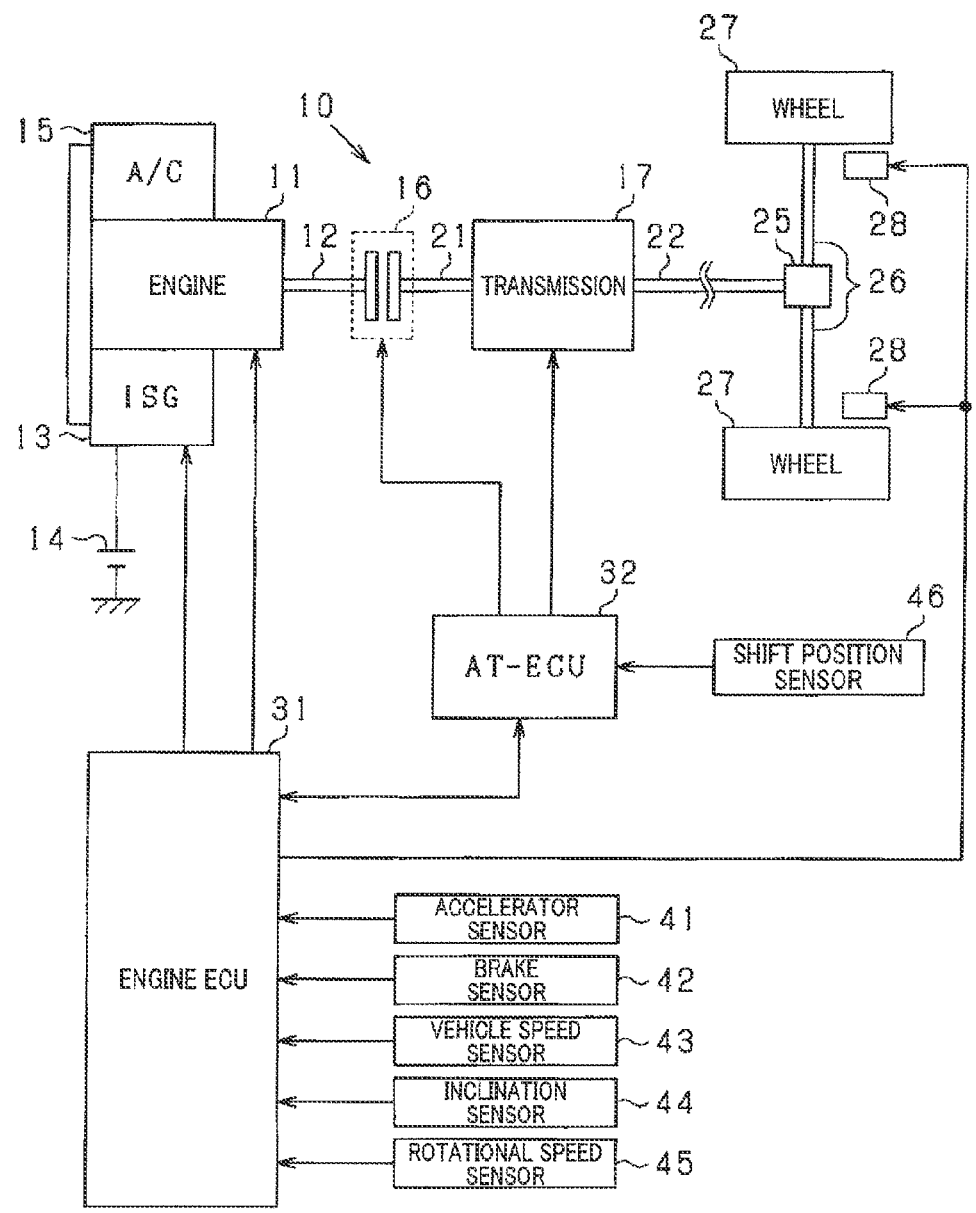
FIG. 1 is a block diagram showing the structure of a vehicle control system including a vehicle control apparatus according to an embodiment of the invention.

FIG. 1 is a block diagram showing the structure of a vehicle control system including a vehicle control apparatus according to an embodiment of the invention. In FIG. 1, the reference numeral 10 denotes a vehicle which runs in a selected one of a normal running mode where its clutch device 16 is engaged to an engine 11 and an inertia running mode (coasting mode) where the clutch device 16 is disengaged from the engine 11.

The engine 11 is a multi-cylinder internal combustion engine supplied with fuel such as gasoline or light oil, the engine 11 including fuel injection valves and ignition devices. The engine is integrally provided with an ISG (Integrated Starter Generator) 13. The shaft of the ISG 13 is coupled to an engine output shaft 12 of the engine 11 through a belt or the like. Accordingly, the shaft of the ISG 13 is driven to rotate by rotation of the engine output shaft 12, while, the engine output shaft 12 is driven to rotate by rotation of the shaft of the ISG 13. That is, the ISG 13 has a generator function for generating electric power (power regeneration function) by rotation of the engine output shaft 12, and a motor function for applying motive power to the engine output shaft 12. To start the engine 11, the engine 11 is applied with initial rotation by rotation of the shaft of the ISG 13.

The ISG 13 is connected with a vehicle mounted battery 14. The ISG 13 operates on the power supplied from the battery 14 which is charged by the power generated by the ISG 13. The power outputted from the battery 14 is used for driving various electrical components mounted on the vehicle.

A compressor 15 of an air-conditioning unit mounted on the vehicle is coupled to the engine output shaft 12 through a belt or the like. When the air-conditioning unit is required to turn on, the compressor 15 is driven by the motive power supplied from the engine 11 to air-condition the cabin of the vehicle. The ISG 13 and the compressor 15 are auxiliaries of the vehicle.

A transmission 17 is connected to the engine output shaft 12 through the clutch device 16 as a power transmitting device provided in a power transmission route. The clutch device 16 is a friction clutch having a clutch mechanism including a disk (flywheel, for example) connected to the engine output shaft 12 on the side of the engine 11, and a disk (clutch disk, for example) connected to a transmission input shaft 21 on the side of the transmission 17. When these disks are caused to contact with each other, a power transmitting state (clutch engaged state) prevails. In the power transmitting state, transmission of motive power between the engine 11 and the transmission 17 is allowed. When these disks are caused to separate from each other, a power blocking state (clutch disengaged state) prevails. In the power blocking state, transmission of motive power between the engine 11 and the transmission 17 is inhibited. In this embodiment, the clutch device 16 is an automatic clutch which is switched between the clutch engaged state and the clutch disengaged state by an actuator such as a motor. The clutch device 16 may be disposed within the transmission 17.

The transmission 17 is an automatic transmission having a plurality of transmission gear ranges. The transmission 17 receives motive power from the engine 11 through the transmission input shaft 21 and outputs it having been speed-changed in accordance with the vehicle speed, the engine speed and the gear shift position to the transmission output shaft 22. The gear shift position is selected by a shift lever (not shown) operated by the driver of the vehicle. In this embodiment, the gear shift position is at either one of D-range (drive range), R-range (reverse range), and N-range (neutral range). The transmission 17 includes an automatic shift mechanism having an actuator such as a motor or a hydraulic device. In the D-range, gear range shifting is performed automatically.

The transmission output shaft 22 is connected with wheels 27 of the vehicle through a differential gear 25 and a drive shaft (vehicle driving shaft) 26. Each of the wheels 27 is provided with a brake actuator 28 which is driven by a not-shown hydraulic circuit to apply a braking force to the wheel 27. The brake actuator 28 is configured to adjust the braking force applied to the wheel 27 in accordance with the pressure of a not shown master cylinder which transmits a pressing force of a brake pedal to hydraulic oil.

The vehicle control system includes an engine ECU 31 for controlling the operation state of the engine 11 and an AT-ECU 32 for controlling the clutch device 16 and the transmission 17. Each of the ECUs 31 and 32 is a microcomputer-based electronic control unit which controls the engine 11 or transmission 17 in accordance with output signals of various sensors. The ECU 31 and the ECU 32 are communicably connected to each other so that they can share various control signals and data signals. In this embodiment, the ECU 31 constitutes the vehicle control apparatus. However, the vehicle control apparatus may be constituted of two or more ECUs.

The various sensors include an accelerator sensor 41 for detecting an amount of pressing of then accelerator pedal, a brake sensor 42 for detecting an amount of pressing of the brake pedal, a vehicle speed sensor 43 for detecting the vehicle speed, an inclination sensor 44 for detecting an inclination angle of a road surface, a rotational speed sensor 45 for detecting the engine speed, and a shift position sensor 46 for detecting the gear shift position of the transmission 17. In this embodiment, the detection signals of the sensors 41 to 45 are inputted to the engine ECU 31, and the detection signal of the shift position sensor 46 is inputted to the AT-ECU 32. Although not shown in the drawings, the vehicle control system includes, other than the above described sensors, a load sensor (airflow meter or suction pressure sensor) for detecting the engine load, a cooling water temperature sensor, an ambient temperature sensor and an atmospheric pressure sensor. The engine ECU 31 performs various engine control such as control of an amount of fuel injection by the fuel injection valve, control of ignition by the ignition device, control of engine start and power generation by the ISG 13 and control of braking by the brake actuator 28. The AT-ECU 32 performs on-off control of the clutch device 16 and shift control of gear ranges of the transmission 17 based on the detection signals of the various sensors and data transmitted from the engine ECU 31.

The vehicle 10 is capable of shifting to the inertia running state by disengaging (turning off) the clutch device 16 to save fuel consumption when a predetermined inertia running condition is satisfied while the vehicle 10 is driven by the motive force of the engine 11. In this embodiment, the inertia running state includes a first inertia running state in which the engine 11 is stopped and the clutch device 16 is disengaged and a second inertia running state in which the engine 11 is operating and the clutch device 16 is disengaged. To cause the vehicle 10 to coast with the clutch device 16 being disengaged (inertia running mode), one of the first and second inertia running state is selected in accordance with presence or absence of a request to drive at least one of the auxiliaries of the vehicle.

Figure 2:
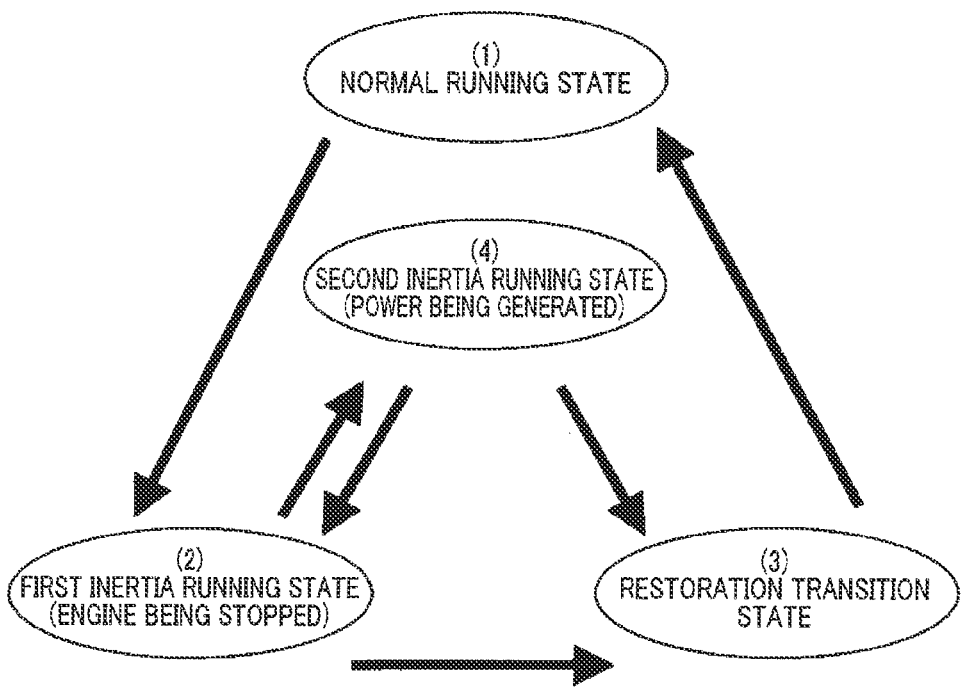
FIG. 2 is a diagram for explaining state transition in an inertia running mode.

FIG. 2 is a diagram for explaining state transition (coasting sequence) in the inertia running mode.

The coasting sequence proceeds in the order of (1) the normal running state, (2) the first inertia running state, (3) the restoration transition state, and (1) the normal running state. In the normal running state, the vehicle 10 is caused to run in a state in which the engine 11 is operating and the clutch device is engaged with the gear shift position being set by the driver. In the first inertia running state, the vehicle 10 is caused to coast in a state in which the engine 11 is stopped and the clutch device 16 is disengaged. The restoration transition state is a state for causing the engine 11 and the clutch device 16 to return to their normal states.

The condition to shift from the normal running state to the first inertia running state includes that the engine speed is stable above a predetermined speed (idle speed, for example), and includes an execution permission condition. The execution permission condition depends on an environmental condition, a vehicle condition, a power supply condition, an engine condition and a driver's operation condition.

Specifically:

the environmental condition includes that the ambient temperature is within a predetermined range, and that the atmospheric pressure is within a predetermined range;

the vehicle condition includes that vehicle speed is within a predetermined range (between 40 km/h and 120 km/h, for example), the road surface slope (inclination) is within a predetermined range, the electrical load driving power is smaller than a predetermined value, and no inhibition request comes out from the vehicle control system;

the power supply condition includes that the battery remaining capacity is within a predetermined range, and electric power is not being generated (except a case where a power generation request occurs), and no inhibition request comes out from the power supply system;

the engine condition includes that the temperature of the engine cooling water is within a predetermined range, the temperature of the transmission hydraulic oil is within a predetermined range, and no inhibition request comes out from the engine system; and the driver's operation condition includes that acceleration is off, the brake pedal is released, the shift lever position is in the D-range, and a mode setting switch is at the inertia running mode.

The vehicle 10 is provided with an idling stop function in which the engine ECU 31 automatically stops the engine 11 when a predetermined automatic stop condition is satisfied, and automatically restarts the engine 11 when a predetermined restart condition is satisfied thereafter. The automatic stop condition includes at least one of that acceleration has been turned off (idle state has been reached), that the brake pedal has been depressed, and that the vehicle speed has decreased below a predetermined speed (10 km/h, for example). The restart condition includes that acceleration has been turned on, and that the brake pedal has been released.

Both the execution permission condition to permit coasting and the automatic stop condition to suspend idling stop control include the vehicle speed condition. However, the vehicle speed condition to permit coasting and the vehicle speed condition to suspend idling stop control do not overlap with each other in their ranges.

The condition to shift from the first inertia running state to the restoration transition state includes at least one of that satisfaction of the execution permission condition has been negated and that an engine start request has occurred. The condition to shift from the restoration transition state to the normal running state includes that engine start has been completed.

In the vehicle control system, other than the above described states (1) to (3), there is defined (4) the second inertia running state. In the second inertia running state, the vehicle 10 can coast in a state in which the engine 11 is operating and the clutch device 16 is disengaged. In the second inertia running state, the ISG 13 can generate electric power, and the engine 11 is controlled to operate at a high efficiency.

The second inertia running state can be shifted from the first inertia running state. After the second inertia running state is reached, a return to the first inertia running state or a shift to the restoration transition state is possible. The condition to shift to the second inertia running state from the first inertia running state includes that an auxiliary start request has occurred. For example, a shift from the first inertia running state to the second inertia running state is made when a power generation request comes out from the ISG 13, or when a request to drive the compressor 15 has occurred to start air-conditioning operation.

The condition to return to the first inertia running state from the second inertia running state includes that an auxiliary drive request (ISG power generation request or compressor drive request, for example) has disappeared.

The condition to shift to the restoration transition state from the second inertia running state includes at least one of that satisfaction of the execution permission condition has been negated and that an engine start request has occurred like the condition to shift from the first inertia running state to the restoration transition state. However, unlike at the time of making a shift from the first inertia running state to the restoration transition state, at the time of making a shift from the second inertia running state to the restoration transition state, since starting of the engine 11 has been already completed, the engine 11 is shifted to the normal running state from the state of ISG power generation. FIG. 3 is a flowchart showing steps of coasting control performed at regular time intervals by the engine ECU 31.

The control begins in step S11 where it is determined whether or not the vehicle 10 is in the normal running state. If the determination result in step S11 is affirmative, the control proceeds to step S12. In step S12, it is determined whether or not the condition to permit coasting is satisfied. If the determination result in step S12 is negative, the control is terminated. If the determination result in step S12 is affirmative, the control proceeds to step S13.

In step S13, the vehicle 10 is caused to shift to the first inertia running state from the normal running state. That is, the engine 11 is stopped, and the clutch device 16 is disengaged.

If the determination result in step S11 is negative, the control proceeds to step S14 to determine whether or not the current state is the first inertia running state. If the determination result in step S14 is affirmative, the control proceeds to step S15 to determine whether or not the condition to permit coasting has been unsatisfied, that is, whether or not a request to return to the normal running state has occurred. If the determination result in step S15 is negative, the control proceeds to step S16 to determine whether or not an auxiliary drive request (ISG power generation request, for example) has occurred. In step S16, presence or absence of a power generation request may be detected based on a parameter representing the remaining battery capacity such as the SOC or terminal voltage of the battery, and also presence or absence of a compressor drive request may be detected based on an air-condition request.

If the determination result in step S15 is affirmative, the control proceeds to step S17 to cause the vehicle 10 to shift from the first inertia running state to the normal running state. More specifically, the vehicle 10 is caused to shift from the first inertia running state to the normal running state by way of the restoration transition state by causing the ISG 13 to restart the engine 13 and engaging the clutch device 16.

If the determination result in step S15 is negative, and the determination result in step S16 is affirmative, the control proceeds to step S18 to determine whether or not the current state is a low-speed running state. For example, when the vehicle speed is lower than a predetermined speed (60 km/h, for example), the current state is determined to be the low-speed running state. If the determination result in step S18 is affirmative, the control proceeds to step S19 to cause the vehicle 10 to shift from the first inertia running state to the second inertia running state. Specifically, the ISG 13 is caused to restart the engine 11 while the clutch device 16 is kept disengaged.

If the determination result in step S18 is negative, that is, if the vehicle 10 is in a high-speed running state, the control proceeds to step S17 to cause the vehicle 10 to shift from the first inertia running state to the normal running state. Specifically, the engine 11 is started and the clutch device 16 is engaged.

If the determination result in step S14 is negative, the control proceeds to step S20 to determine whether or not the current state is the second inertia running state. If the determination result in step S20 is affirmative, the control proceeds to step S21 to determine whether or not the condition to permit coasting has been cancelled, that is, whether or not a request to return to the normal running state has occurred. If the determination result in step S21 is negative, the control proceeds to step S22 to determine whether or not an auxiliary drive request (ISG power generation request, for example) has disappeared.

If the determination result in step S21 is affirmative, the control proceeds to step S17 to cause the vehicle 10 to shift from the second inertia running state to the normal running state. Specifically, the ISG 13 is caused to restart the engine 11 and the clutch device 16 is engaged.

If the determination result in step S21 is negative, and the determination result in step S22 is affirmative, the control proceeds to step S23 to cause the vehicle 10 to shift from the second inertia running state to the first inertia running state. That is, the engine 11 is stopped while the clutch device 16 is kept disengaged.

FIG. 4 is a time chart for explaining an example of coasting of the vehicle 10. In this example, the road surface is assumed to be flat. The condition to permit coasting is satisfied at time t1.

The vehicle 10 is in the normal running state before time t1, and starts coasting in the first inertia running state when the accelerator is turned off at time t1.

That is, the engine 11 is stopped and the clutch device 16 is disengaged at time t1.

After time t1, since the vehicle 10 coasts, the vehicle speed decreases gradually.

At time t2, a power generation request occurs due to decrease of the battery remaining capacity (SOC), as a result of which the engine 11 is started for causing the ISG 13 to generate electric power. As a result, power generation is started by the ISG 13 and the vehicle 10 is shifted to the second inertia running state. In this example, the vehicle 10 is assumed to be in the low-speed running state. However, if the vehicle 10 is in the high-speed running state, the vehicle 10 is returned to the normal running state at time t2.

Thereafter, when the power generation request disappears at time t3, the engine 11 is stopped and the vehicle 10 returns to the first inertia running state. When the accelerator is turned on at time t4, the clutch device 16 is engaged, and the vehicle 10 runs in the normal running state from then on.

Although the engine 11 is started during the period between time t1 and time t4 in accordance with the auxiliary drive request, since the clutch device 16 is kept disengaged, the vehicle speed continues to decrease gradually during this period. Accordingly, the effect of increase of fuel economy can be prevented from becoming insufficient.

The vehicle 10 running in the first inertia running state returns to the normal running state or shifts to the second inertia running state depending on which of a request to return to the normal running state and a request to generate electric power occurs earlier. In this example, since the request to generate electric power occurs earlier after time t1, the vehicle 10 is caused to shift to the second inertia running state at time t2. The vehicle 10 running in the second inertia running state returns to the normal running state or shifts to the first inertia running state depending on which of a request to return to the normal running state and cancellation of a request to generate electric power occurs earlier. In this example, since cancellation of the request to generate electric power occurs earlier after time t2, the vehicle 10 is caused to shift to the first inertia running state at time t3.

The above described embodiment of the invention provides the following advantages.

If an auxiliary drive request occurs when the vehicle 10 is running in the first inertia running state in which the engine 11 is stopped and the clutch device 16 is disengaged, the vehicle 10 is caused to shift to the second inertia running state in which the engine 11 is operating and the clutch device is disengaged. The situation in which an auxiliary drive request occurs when the vehicle 10 is in the first inertia running state is a situation in which the engine 11 is required to operate for a purpose other than driving the vehicle 10. Accordingly, keeping the clutch device disengaged does not pose any problem. Further, although the engine 11 starts to operate, since the vehicle 10 keeps coasting, there is no concern that large vibration occurs unexpectedly or the coasting ends too early. Hence, according to this embodiment, it is possible to increase the fuel economy without causing the driver to feel odd when the vehicle 10 is coasting.

The vehicle 10 running in the first inertia running state shifts to the second inertia running state or returns to the normal running state depending on which of an auxiliary drive request and a request to return to the normal running state occurs earlier. Accordingly, the running state of the vehicle can be shifted appropriately depending on the circumstances while the vehicle is coasting.

Generally, the driver and passengers of a vehicle feel less odd by vibration due to clutch engagement when the vehicle is in the high-speed running state than when the vehicle is in the low-speed running state. Further, when the vehicle is in the high-speed running state, since the regenerative electric power by the ISG 13 is expected to be large, it often occurs that causing the clutch device to engage to obtain regenerative electric power is advantageous in fuel economy compared to causing the engine to generate electric power. In the above described embodiment, a shift is made from the first inertia running state to the second inertia running state in accordance with an auxiliary drive request when the vehicle is in the low-speed running state, and a shift is made from the first inertia running state to the normal running state in accordance with an auxiliary drive request when the vehicle is in the high-speed running state. This makes it possible to further increase the fuel economy without causing the driver to feel that something unusual is occurring when the vehicle is coasting.

OTHER EMBODIMENTS

It is a matter of course that various modifications can be made to the above described embodiment as described below.

When an auxiliary drive request has occurred while the vehicle 10 is running in the first inertia running state, a state shift may be made differently depending on whether this request is for requesting the ISG 13 to generate electric power or requesting the compressor 15 to be driven. For example, when a request requesting the ISG 13 to generate electric power has occurred when the vehicle 10 is running in the first inertia running state, the vehicle 10 may be shifted to either the second inertia running state or the normal running state depending on whether the vehicle 10 is in the high-speed running state or in the low-speed running state. On the other hand, when a request to drive the compressor 15 has occurred, the vehicle 10 may be shifted to the second inertia running state regardless whether the vehicle 10 is in the high-speed running state or in the low-speed running state.

The above described embodiment is configured to make a shift to the second inertia running state or the normal running state depending on whether the vehicle 10 is in the low-speed running state or in the high-speed running state when an auxiliary drive request has occurred during the first inertia running state. However, the above described embodiment may be modified so as to make a shift always to the second inertia running state when an auxiliary drive request has occurred during the first inertia running state.

The auxiliaries are not limited the ISG 13 and the compressor 15, but include any apparatus or machine driven by the engine 11. For example, in a case where a starter and an alternator are mounted separately on the vehicle instead of the ISG 13, the alternator is one of the auxiliaries.

The above explained preferred embodiments are exemplary of the invention of the present application which is described solely by the claims appended below. It should be understood that modifications of the preferred embodiments may be made as would occur to one of skill in the art.

What is claimed is:

1. A vehicle control apparatus for a vehicle which includes an engine as a drive power source of the vehicle, an auxiliary driven by the engine, and a clutch device provided in a power transmission route connected to an output shaft of the engine, comprising:
   a condition determination section that determines whether or not an execution permission condition to permit coasting of the vehicle is satisfied;
   a first control section that causes the vehicle to shift to a first inertia running state by stopping the engine and disengaging the clutch device when the execution permission condition is determined to be satisfied;

an auxiliary drive request determination section that determines whether or not an auxiliary drive request to drive the auxiliary has occurred; and a second control section that causes the vehicle to shift to a second inertia running state by starting the engine keeping the clutch device disengaged when the auxiliary drive request is determined to have occurred while the vehicle is running in the first inertia running state.

2. The vehicle control apparatus according to claim 1, further comprising a return request determination section that determines whether or not a return request to return the vehicle to a normal running state in which the vehicle is driven to run by a motive power of the engine has occurred while the vehicle is coasting, the second control section being configured to shift the vehicle running in the first inertia running state to the second inertia running state when the auxiliary drive request is determined to have occurred earlier than the return request, and to shift the vehicle running in the first inertia running state to the normal running state when the return request is determined to have occurred earlier than the auxiliary drive request.

3. The vehicle control apparatus according to claim 2, further comprising a running state determination section that determines whether the vehicle is in a high-speed running state or in a low-speed running state when the auxiliary drive request is determined to have occurred while the vehicle is running in the first inertia running state, the second control section being configured to shift the vehicle from the first inertia running state to the second inertia running state if the vehicle is determined to be in the low-speed running state, and shift the vehicle from the first inertia running state to the normal running state if the vehicle is determined to be in the high-speed running state.

4. The vehicle control apparatus according to claim 3, wherein the vehicle includes, as the auxiliary, an alternator connected to the output shaft of the engine, and the second control section is configured to shift the vehicle to either the second inertia running state or the normal running state depending on whether the vehicle is determined to be in the low-speed running state or in the high-speed running state when the auxiliary drive request is a request to cause the alternator to generate electric power.

* * * * *